United States Patent [19]

Lyman

[11] Patent Number: 4,948,070
[45] Date of Patent: Aug. 14, 1990

[54] INFLATABLE EXTERNAL FUEL TANK

[75] Inventor: Richard R. Lyman, Bountiful, Utah

[73] Assignee: TRE Corporation, Los Angeles, Calif.

[21] Appl. No.: 43,154

[22] Filed: Apr. 27, 1987

[51] Int. Cl.⁵ .............................................. B64D 37/06
[52] U.S. Cl. .............................. 244/135 R; 220/85 R; 244/135 B; 244/105
[58] Field of Search .............. 244/135, 105; 220/85 B; 114/292, 123

[56] References Cited

U.S. PATENT DOCUMENTS

| | | | |
|---|---|---|---|
| 2,507,913 | 5/1950 | Lanser | 244/105 |
| 2,726,056 | 12/1955 | Tatom et al. | 244/135 B |
| 3,101,921 | 8/1963 | Price | 244/135 B |
| 3,380,691 | 4/1968 | McComas | 244/135 R |

Primary Examiner—Galen Barefoot
Attorney, Agent, or Firm—Spensley Horn Jubas & Lubitz

[57] ABSTRACT

An inflatable external fuel tank is disclosed for carrying fuel under an aircraft wing, the tank having a predetermined displacement when full and being collapsible to a lesser displacement when empty. The tank skin is comprised of a flexible thermoplastic material. A keel structure is located inside the tank and defines the diameter and longitudinal length of the tank.

13 Claims, 2 Drawing Sheets

U.S. Patent    Aug. 14, 1990    Sheet 1 of 2    4,948,070
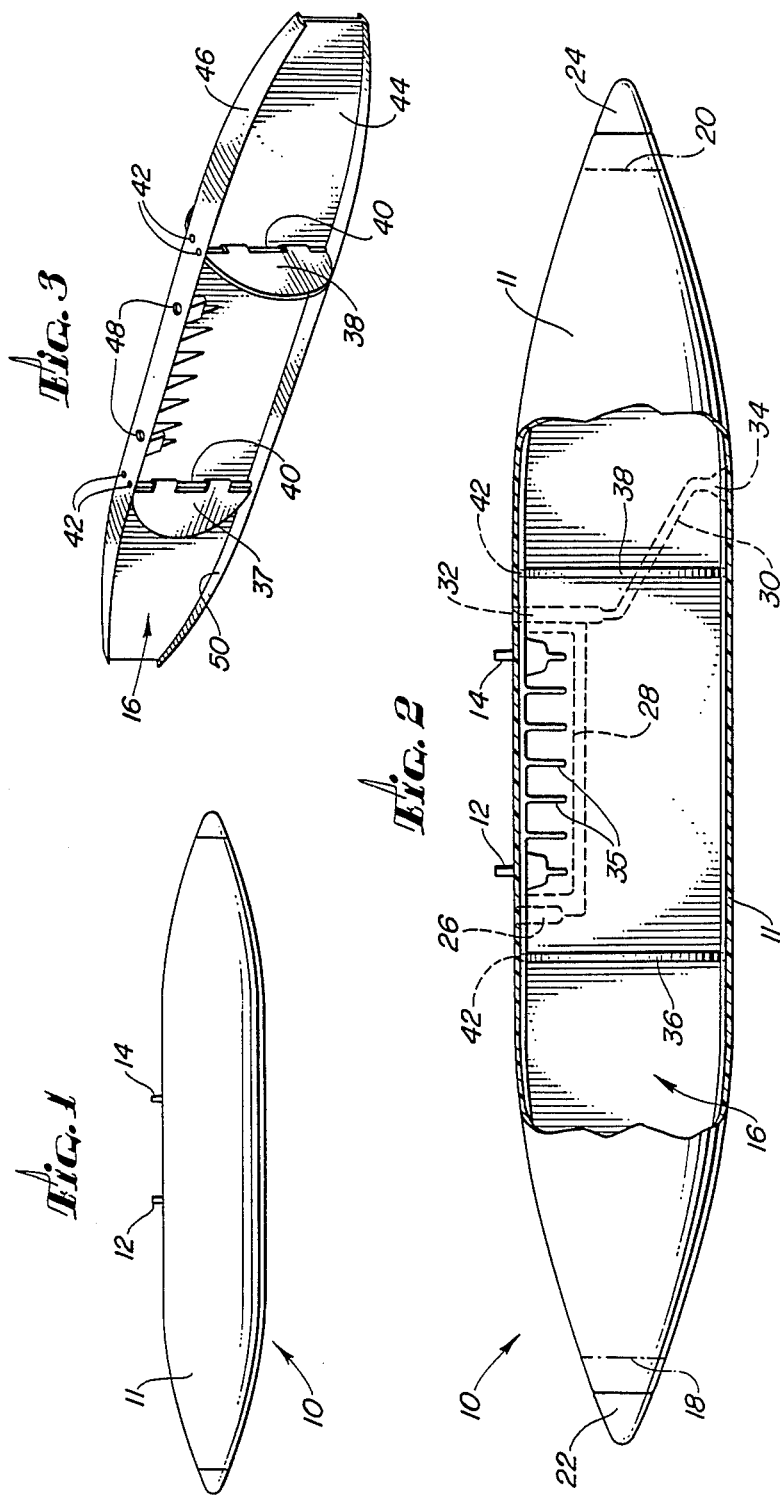

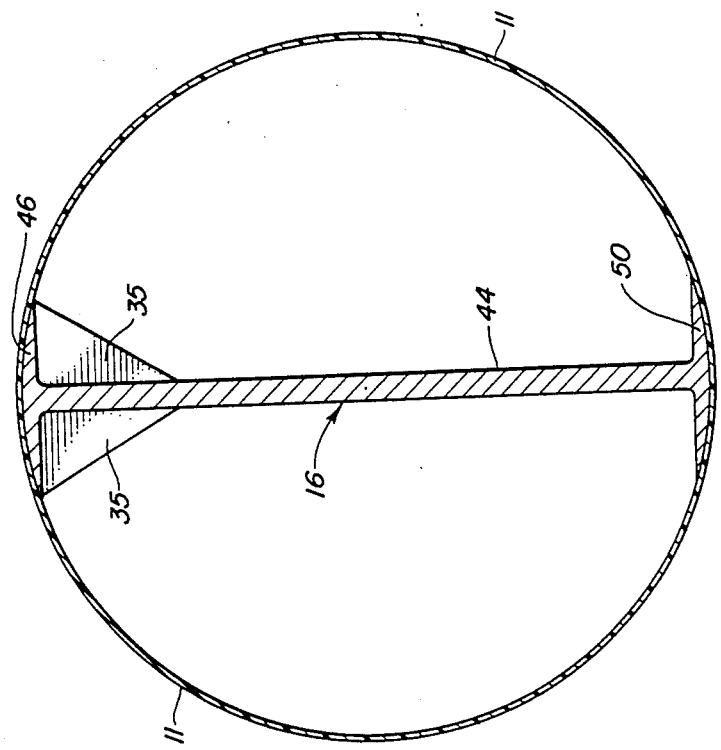
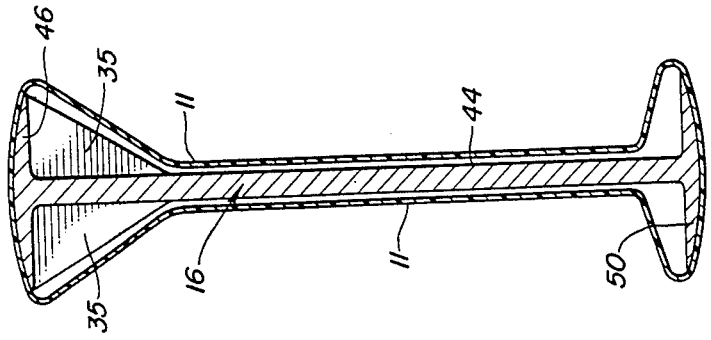

INFLATABLE EXTERNAL FUEL TANK

BACKGROUND OF THE INVENTION

1. Field of the Invention

This invention relates to tanks for the storage and carrying of fluids and, more particularly, to high packing density, low-cost external fuel tanks for aircraft.

2. Description of the Related Art

Military aircraft operations frequently require much uploading and downloading of fuel and munitions. During such operations, it is important to (a) minimize the time required to prepare aircraft for operations and to service aircraft that have landed so that they are again flight-ready and (b) minimize the potential for a fuel fire hazard from fuel vapor ignition. Military aircraft operations frequently utilize external fuel tanks in order to extend the range and flying time of aircraft. Such aircraft operations require external fuel tanks that may be easily and safely transported and that can withstand some degree of ballistic impact (gunfire), physical impacts (crash), and internal fuel ignition (explosion) without rupture, also known as having limited survivability.

External fuel tanks that are constructed of metal and that may be disassembled for economical shipping or storage when not in use are referred to as "nestable" fuel tanks because, when disassembled, the parts making up individual fuel tanks may be stacked or nested within each other in crates and therefore have a high packing density. Typically, metal nestable fuel tanks have a packing density ratio of from 4:1 to 10:1. That is, the parts making up from 4 to 10 fuel tanks may be stored in nested condition in the same amount of space (cubic feet) required for the packing crate of one fully assembled fuel tank. Unfortunately, metal nestable external fuel tanks may require from four to twelve man-hours or more to assemble.

Typically, a nestable fuel tank may be separated into nose and tail cone sections and a generally cylindrical center section. The nose and tail sections may be removed from the center section by removing a clamping seal ring and may then be stacked, one inside another. The clamping seal ring may be a separate part of the center section or may be an integral part, being welded to the center section. The center section is typically a cylinder that is bolted and sealed by a longitudinal clamp bar and that may be opened for disassembly sufficiently to allow other tank center sections to be inserted inside. Longitudinally spaced frame sections are overwrapped on the circumference by the center section metallic skin of the tank to complete the assembly of the major components of a typical nestable fuel tank.

More importantly, metal nestable external fuel tanks are not particularly impact resistant and easily break apart even from minor impacts, creating an extreme fuel fire hazard. Furthermore, metal nestable external fuel tanks typically explode when subjected to fuel vapor ignition from an electrical component short circuit, static electric discharge, lightning strike or ballistic impact from an incendiary round of ammunition. The most serious deficiency in a metal fuel tank is "hydraulic ram" failure from ballistic impact when the tank is full of fuel. Typically, even small arms fire from thirty caliber rounds will catastrophically rupture a standard metal tank, blowing the tank apart as in an explosion. Standard aluminum nestable fuel tanks are not particularly resistant to fuel fires. For example, aluminum fuel tanks will only last for approximately two to three minutes before melting open or rupturing in a fuel fire.

External fuel tanks constructed of high strength composite plastic materials using filament winding techniques are not nestable but are extremely resistant to crash impact, internal explosions from fuel vapor ignition, ballistic impact, and external fuel fires. Such tanks are typically comprised of a filament-wound fiberglass material defining inner and outer layers with a rigid structural plastic foam or honeycomb material placed between the layers. These high strength composite materials are usually applied onto a thin, leak-tight metallic or plastic liner. The fiberglass material is typically impregnated with a thermosetting plastic resin material. These tanks typically survive ballistic impacts from rounds in excess of fifty caliber with only modest amounts of leakage and will not rupture when exposed to hydraulic ram effects from ballistic impact on a fully fueled tank. These tanks also remain leak-free, retain their structural strength, and will not rupture even when subjected to internal explosions. These plastic, sandwich construction tanks have been able to maintain their containment structure when crash impacted onto concrete from a height of twenty-five feet and with a forward velocity of forty-five feet per second (thirty miles an hour), where a metal nestable tank will only withstand a vertical drop of four to six feet with no forward velocity. The plastic tanks have survived intense external fuel fires for more than ten minutes, and have suffered only superficial damage when subjected to a forced ejection while being suspended from an aircraft. All of these conditions, except forced ejection, would destroy a typical metal nestable fuel tank. Thus, although plastic tanks cannot be disassembled for compact storage, they survive under conditions that would destroy ordinary metal nestable fuel tanks.

The compactness of metal nestable fuel tanks is a very desirable feature for military aircraft operations. Compactness is especially important in transportation of tanks and most importantly in aircraft carrier operations, where all equipment must be kept on board the ship and space is at a premium. Military operations also place extreme importance on safety and survivability. Thus, there is a need for external fuel tanks with the safety and survivability features of plastic tanks that also have the high packing density of metal nestable tanks.

SUMMARY OF THE INVENTION

The present invention provides an external fuel tank with a high packing density similar to that of metal nestable tanks, but also provides many of the survivability qualities of plastic sandwich construction tanks. The present invention provides a tank having a flexible, filament-wound thermoplastic or thermosetting plastic exterior wall carrying a planar central support member or keel structure. Thus, rather than utilizing an internal frame structure that generally defines the circumference of the tank, the present invention utilizes a keel structure, which is in the shape of an I-beam, and allows the wall of the tank itself to determine and limit the circumference of the tank. When the tank is not carrying fuel, the tank wall may be collapsed against the keel structure. This allows an external fuel tank constructed in accordance with the present invention to have the safety and survivability features of plastic fuel tanks and also to have the high packing density of nestable metal fuel tanks. External fuel tanks constructed in accordance with the present invention have a nestable storage ratio of from 4:1 to 7:1. Furthermore, the cost per tank can be roughly one-half that of similar size metal fuel tanks. Finally, these tanks may be loaded onto an aircraft with minimum assembly required and in one-half of an hour or less, compared to the four to twelve man-hours now necessary for metal nestable fuel tanks.

In its stored or nested condition, the external fuel tank of the present invention is in a "deflated" condition. That is, the walls of the tank are collapsed against the keel structure. Inflation of the fuel tank can be accomplished either with air pressure or simply by filling the tank with fuel. This forces the walls of the tank out from the keel structure until they assume their maximum dimensions. Thus, a tremendous amount of time is saved in going from the nested or stored condition to the operational condition when compared with current nestable metal fuel tanks.

The central support member or keel structure of the present invention may incorporate within its structure various elements required for successful operation of the fuel tank. For example, the keel structure may include integrally formed fuel lines and fuel level transducers. Air lines for pressurization of the tank contents may also be included in the keel structure. Lugs and sway brace gussets may be included in the keel structure for hanging the fuel tank from an aircraft wing. The skin or exterior wall surrounding the keel structure is produced using filament-winding techniques in which fibers are wound around the desired tank shape and impregnated with a sealant resin coating. Preferably, the coating used is a flexible thermoplastic or thermosetting plastic resin which gives the skin the desired ability to stretch. Furthermore, in order to "pre-stress" the tank wall, filament-winding is carried out with a tank liner kept inflated at operating pressure during manufacturing.

Any number of suitable methods may be used in order to provide the keel structure within the fuel tank. One method may be to form the fuel tank as two halves, the tank being split along its longitudinal center line. Each half may then be joined to the keel structure and the seam formed along the junction and the two halves may then be sealed. Alternatively, one may form a cylindrical bladder or flexible tube that is open on at least one end, into which the keel may be inserted. The insertion may be accomplished by placing the bladder or tube into a vacuum chamber, the open end or mouth of the tube being open to the outside, thus pulling the tube out into the chamber to its full extent. The keel structure may then be inserted into the mouth of the tube and then the rest of the way into the tube. The vacuum may then be released, pulling the tube around the keel structure. The end portion of the tank may then be attached to the cylindrical bladder or the mouth may be closed up.

The novel features which are believed to be characteristic of the present invention, together with further objectives and advantages thereof, will be better understood from the following detailed description considered in connection with the accompanying drawings. It should be expressly understood, however, that the drawings are for purposes of illustration and description only and are not intended as a definition of the limits of the invention.

BRIEF DESCRIPTION OF THE DRAWINGS

FIG. 1 shows a side view of an external fuel tank in accordance with the present invention.

FIG. 2 shows a partial cut-away side section of the external fuel tank.

FIG. 3 shows a perspective view of the keel structure.

FIG. 4 shows a center section of the fuel tank in its deflated condition.

FIG. 5 shows a center section of the fuel tank in its inflated condition.

DETAILED DESCRIPTION OF THE DRAWINGS

FIG. 1 shows a side view of the preferred embodiment of an external fuel tank 10 in accordance with the present invention. The skin 11 of the tank, forming the walls, is shown in its expanded, "inflated" condition. The skin may be constructed of any flexible, resilient and leak-free material, such as thermoplastic or thermosetting plastic impregnated fiberglass, aramid or graphite fibers. The top center line of the fuel tank is provided with lugs 12 and 14 for fastening the fuel tank to an aircraft wing. FIG. 2 shows the preferred embodiment in a partially cut-away section that shows the internal planar central support member or keel structure 16. The keel structure and the internal volume of the fuel tank end at the lines marked with reference numerals 18 and 20. End caps 22 and 24 are non-structural fairings that are attached to the ends of the fuel tank proper for aerodynamic purposes.

FIG. 2 also shows a float switch 26 used to generate an electrical signal that indicates the level of fuel in the tank. The float switch may be contained integrally in the keel structure 16, along with the necessary electrical wiring for communicating the float switch reading to other aircraft systems. An air line 28 may also be provided integrally in the keel structure to provide pressurization of the fuel tank contents in order to force fuel out of the external tank and into the aircraft fuel system. Once the aircraft engine is at operating speed, bleed air from the engine is taken and supplied to the air line 28, pressurizing the fuel in the tank. Fuel line 30 extends form a lower part of the fuel tank to a top surface of the fuel tank at a fitting 32. The fuel line 30 may also be provided integrally in the keel structure. The fitting 32 joins the internal fuel line 30 of the tank to the aircraft fuel system. A drain valve 34 for draining the contents of the fuel tank is located at the bottom surface of the fuel tank.

Baffles 36 and 38 are shown in FIGS. 2 and 3. The baffles consist of half-circle structures attached on both sides of the keel structure by means of hinge pins 40. The baffles may either be folded up against the longitudinal surface of the keel structure, the position assumed by baffle 37 shown in FIG. 2, or the baffles may be extended once the tank is inflated, the position assumed by baffles 36 and 38. When rotated into position, the baffles extend outward from the keel structure into the volume of the fuel tank. When in this extended position, they serve to prevent rapid movement of fuel within the fuel tank, preventing sloshing of fuel and rapid changes in the fuel tank center of gravity. Any rapid change in the center of gravity of the fuel tank during flight can cause flight dynamics problems and can prevent the pilot from safely controlling the aircraft. In order to place the fuel tank in its nestable configuration, the baffles may be rotated so as to lie adjacent the keel structure, as illustrated by baffle 37 in FIG. 3. The hinge pin 40 of the baffle terminates at an external portion of the fuel tank at the position indicated by reference numeral 42. The end 42 of the hinge pin 40 may be configured so as to accept an Allen wrench or other suitable tool for rotation of the baffle between its folded and extended positions.

As most clearly shown in FIG. 3, the keel structure 16 consists of a planar surface 44 extending generally the length of the internal volume of the fuel tank. This planar surface 44 generally defines the diameter of the tank. Both ends of the planar surface 44 are tapered toward a point, thereby generally defining the aerodynamic "cigar shape" of the fuel tank. A top flange 46 and bottom flange 50 extend along the top and bottom edges, respectively, of the planar surface of the keel structure. The top flange 46 includes openings for the hinge pins 42 of the baffles and also includes openings 48 into which the lugs 12, 14 may be located for mounting the fuel tank to the aircraft. Preferably, the keel structure, except for the baffles, is constructed as an single, integral light-weight composite structure. The baffles may also be constructed of a light-weight composite material.

The top flange 46 of the keel structure extends outward from the planar surface 44 for a distance sufficient to provide a surface against which sway braces (not illustrated) may be clamped. Typically, sway braces extend from a wing pylon structure that is fastened to the underside of the aircraft wing to which the fuel tank will be attached. The lugs 12, 14 of the tank are supported by hooks extending from the wing pylon. In order to hold the fuel tank firmly and prevent any movement of the fuel tank during flight, sway braces having foot pads are extended from the pylon on opposite sides of the fuel tank center line until the foot pads make firm contact with the fuel tank surface above the top flange 46, bracing themselves against the tank. Thus, the sway braces are extended against the top flange 46 rather than the unsupported skin 11 of the tank. In this way, the fuel tanks will be firmly held in position even when they have not been filled with fuel and when the fuel that is contained within the tanks has not been pressurized. A plurality of gussets 35 are shown in FIG. 2 and may be included on the keel structure in order to strengthen the top flange 46. The gussets are formed as square or triangular plates that extend from the underside of the top flange to the adjacent keel planar surface 44.

FIG. 4 shows a cut-away section of the fuel tank in its deflated or nested condition. The keel structure 16 is shown contained within the thermoplastic or thermosetting plastic/fiberglass, aramid or graphite fiber fuel tank skin 11. The skin 11 is laid against the top flange 46 and bottom flange 50, while the remaining portion of the fuel tank skin 11 is shown pressed against the keel structure planar surface 44 or extending in a generally straight line from the edges of the top and bottom flanges to the point where the skin contacts the keel structure 44. In this deflated condition, the tanks may be stacked on their sides in an interlocking arrangement, the keel structures of two tanks being separated by the flange of another tank.

FIG. 5 shows the fuel tank of the present invention in its inflated condition, ready to carry fuel. The fuel tank skin 11 is shown extending about the keel structure 16 in a generally circular arrangement. Preferably, the tank is constructed in this expanded or inflated condition by the following procedure.

A polyurethane or other suitable flexible, leak-tight material is formed into a tube or cylinder. The tube is used as a bladder or liner for the tank. One end of the tube may be stretched over a cylindrical or ring-shaped tool, the tube being placed in a vacuum chamber and the tool being placed outside the chamber. A vacuum is produced inside the chamber, on the outside of the tube, so that the tube is stretched and pulled out into the chamber. The vacuum thereby creates a tube or cylinder, extending into the chamber, into which the keel structure may be inserted. Once the keel structure is inserted into the polyurethane tube, the vacuum is released, contracting and closing the tube tightly over the keel structure. The polyurethane tube may be bonded to the keel structure along the flanges with glue or adhesive cement mixtures or other suitable methods that prevent separation and movement. The polyurethane tube and keel structure may then be removed from the chamber and the tool and the mouth of the tube may be sealed.

Air pressure may next be applied into the tube via a fitting or valve so as to inflate the tube out to its maximum diameter. The filament winding process is then carried out on the inflated tube. Preferably the tube is inflated to a pressure equal to the tank's operating pressure and the pressurization is maintained throughout the filament winding process, including the impregnation of fibers with resin and oven curing. In this way, the tank skin is "pre-stressed" and will be under no load until nominal operating pressures are exceeded. After the filament winding process has been completed and the tank has been cured, the tank may be subjected to a vacuum by evacuating air from the internal volume of the tank. The sides of the tank are thereby pulled in against the keel structure, as shown in FIG. 4. In this deflated condition, the tank may be compactly stored, ready for use. When the tank is to be used, it can be inflated by air pressure and then filled with fluid or simply by filling it with the fluid it is to carry.

What is claimed is:

1. A collapsible tank for carrying liquid, comprising:
   a generally planar central support member having top and bottom edges and a substantially planar surface; and
   a flexible skin completely enclosing the support member and attached to the support member at said edges, said skin being collapsible from an expanded condition in which there is a liquid-carrying space between the skin and the support member to a collapsed condition in which the skin is adjacent the substantially planar surface of the support member,
   whereby the tank in the collapsed condition has a nestable storage ratio of at least 4:1.

2. The collapsible tank as claimed in claim 1, further including an end cap fairing covering at least one end of the tank.

3. A tank for carrying liquid having a predetermined displacement when full of liquid and being collapsible to a lesser displacement when empty, the tank comprising:
   a generally planar keel structure defining the diameter and longitudinal length of the tank and having a substantially planar surface; and
   a flexible skin completely enclosing the keel structure for containing the liquid and defining an outer displacement of the tank and a collapsed condition of the tank in which the skin is adjacent the substantially planar surface of the keel structure,
   whereby the tank in the collapsed condition has a nestable storage ratio of at least 4:1.

4. The tank of claim 3 wherein the flexible skin is comprised of a thermoplastic or thermosetting plastic-impregnated fiber matrix.

5. The tank of claim 3 wherein the keel structure is comprised of a plastic composite material.

6. The tank of claim 3 wherein the keel structure is comprised of:
a planar center section disposed along the center line of the tank and
top and bottom flanges disposed along the edge of the center section and extending outward therefrom.

7. The tank as claimed in claim 3, wherein the keel structure includes one or more baffles extending from the keel structure.

8. The tank as claimed in claim 7, wherein at least one of the baffles is pivotably connected to the planar keel structure.

9. The tank as claimed in claim 6, wherein the top flange includes supporting lugs for hanging the tank from an aircraft.

10. The tank as claimed in claim 6, wherein the keel structure includes gussets extending from the top flange to the planar center section.

11. The tank as claimed in claim 3, further including an end cap fairing covering at least one end of the tank.

12. The tank as claimed in claim 3, wherein the keel structure includes lines carrying the liquid into and out of the tank.

13. A tank for carrying liquids comprising:
a flexible skin forming the exterior surface of the tank and defining the tank volume, where the tank has a first volume when the tank is full of liquid and a second, lesser volume when the tank is empty; and
a support structure completely enclosed by the skin and carried within the tank, the support structure having a substantially planar surface and attachment means for supporting the tank from the exterior of an aircraft, the skin being adjacent to the substantially planar surface when the tank is empty, the empty tank having a nestable storage ratio of at least 4:1.

* * * * *